(No Model.)
J. M. STEARNS, Jr.
Telephone.
No. 231,627. Patented Aug. 24, 1880.
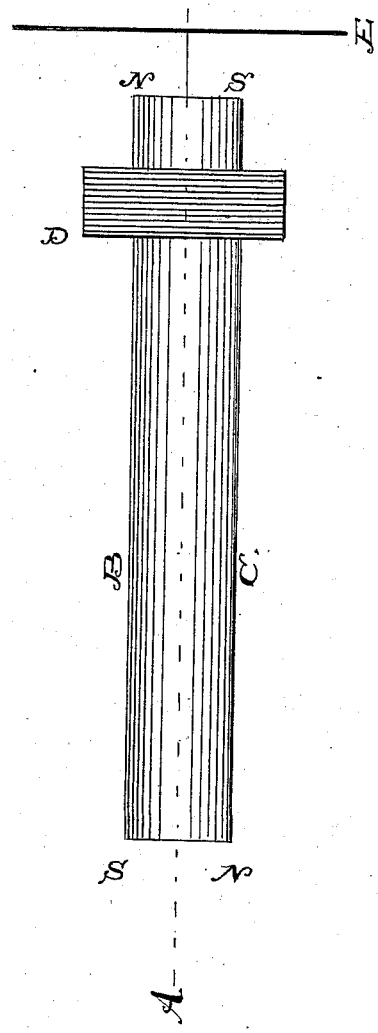
WITNESSES
F. H. Fitch
Daniel A. Pruden
INVENTOR
J. Milton Stearns Jr.

UNITED STATES PATENT OFFICE.

J. MILTON STEARNS, JR., OF BROOKLYN, ASSIGNOR OF ONE-HALF OF HIS RIGHT TO FREDERICK K. FITCH, OF NEW YORK, N. Y.

TELEPHONE.

SPECIFICATION forming part of Letters Patent No. 231,627, dated August 24, 1880.

Application filed April 6, 1880. (No model.)

*To all whom it may concern:*

Be it known that I, J. MILTON STEARNS, Jr., residing at 241 Lorimer street, in the city of Brooklyn, Kings county, and State of New York, have invented a new and Improved Telephone; and I do hereby declare that the following is a full and exact description thereof, reference being had to the drawing accompanying this specification, and the letters of reference thereon.

My invention has for its object the production of a telephonic instrument which, under the influence of an electric current, shall be delicately sensitive to sound impressions, and shall, moreover, be incapable of responding to the effects of induction from neighboring and independent lines.

My invention accordingly consists in constructing the instrument on what may be termed the "astatic" principle, whereby in its normal state it will be inactive and inoperative, the magnetic properties of its core being latent, and the effects developed only when the magnetic balance or equilibrium is disturbed.

To enable others to make and use my invention, I now proceed to describe its construction and operation.

I construct my telephone as follows, viz: In place of the usual steel magnet and soft-iron electro-magnet, or magnet of any kind capable of attracting externally-magnetic substances, I form the core answering in position to the magnet of the common or Bell telephone of two, four, or any other even number of hard-steel square or half-round or other shaped steel bars of equal length and weight as possible, and such bars being as strongly and equally magnetized as possible. I place them lengthwise alongside of and in close contact with each other in pairs, (one or more,) each pair having the opposite poles of its two component magnets in close contact with each other, so that all external magnetic or visible magnetic effects are completely canceled by such combination, each pair (if more than one pair be used) being placed alongside of each other pair on same principle to correct and cancel every accidental residuum of magnetism, and in short form an astatic core for a telephone not of itself possessed of magnetism. A proper coil of insulated wire is placed over the core thus formed, or the core thus formed wound with insulated wire, or such coil or insulated wire is placed in any position in proximity to such core, or the core is thrust through an aperture in said coil or touching it in any manner of position. A diaphragm of thin iron or steel is placed near to either end of such core, fastened to it or slightly separated, at option, and the whole mounted in any convenient case, the two ends of the wire of the coil being passed to proper screw-cups for external connections. The whole instrument thus constructed is then ready for use in the place of the ordinary Bell or other telephone when the same and where the same is used as a receiving-telephone on any line where there is a primary current, a transmitter, and the receiver in the secondary current or the alternating current.

It will be observed that a telephonic instrument constructed on the plan described is peculiar in these respects, viz: The permanent magnetism of its core is entirely canceled, and therefore the core is not a magnetic core. The instrument is not in its normal state a magneto-electric telephone, nor will a pair of instruments produce any audible effects independently of an electric current employed to develop their latent capacities. No electric current will be generated by the vibration of the diaphragm in front of or near the astatic core. It acts only when an electric current from an external source passes into its coils, and such electric current does not generate magnetism in the core by its own action, but by cancellation enables a portion of the resident dead magnetism to act. This is demonstrated by passing a current in different directions through the coil, when it will be found that only those portions of the coil-face are magnetic whose polarity corresponds with the direction of the current, while the rest of the face remains not magnetic. If an electro-magnet were formed the whole face would be equally magnetized.

The instrument thus constructed is therefore not a telephone itself, and becomes one only when placed in certain conditions, and acts only as such when in such positions and conditions necessary to its action; and as its construction is of the same nature, it is to be designated "astatic," with the same advantage as to delicacy as the like-named galvanometer.

The astatic telephone can be made quite free from the effects of induction from neighboring lines or wires, arising from the fact that the diaphragm remains in its normal condition, not tightly strained, as in the magneto-electric telephone. The magnets being first adjusted to cancel the induction of the line till that is inappreciable, the electric-current variations of its own line alone become audible.

The following are the literal references to the drawing: A, core composed of two hard-steel equally-magnetized bars, square or half-round, B C, laid alongside of and in close contact with each other, their respective poles N S N S being in contact, so as to cancel all magnetism; D, coil; E, diaphragm. The case is omitted as unnecessary. More than one pair of magnets may be used, at option.

What therefore I claim, and desire to secure by Letters Patent, is—

1. An astatic telephonic instrument in which the core is composed of one or more steel magnetized bars so arranged with their dissimilar poles in contact as to entirely cancel external magnetism, substantially as described.

2. The combination, with the diaphragm and a suitable electric coil, of a core embracing one or more steel magnetized bars, having their dissimilar poles in contact or relatively arranged so as to cancel external magnetism.

3. The method of canceling induction of neighboring lines in a telephonic instrument having an astatic core, consisting in adjusting said core so that said induction will be inappreciable in the instrument without destroying the sensitiveness of the instrument to direct currents.

4. In a telephonic instrument, the combination of a diaphragm, electric coil, and astatic core, substantially as specified.

5. A telephonic instrument having an astatic core, substantially as described.

J. MILTON STEARNS, Jr.

Witnesses:
DANIEL A. PRUDEN,
RUSSELL A. GREEN.